United States Patent [19]

Wall

[11] Patent Number: 4,575,258
[45] Date of Patent: Mar. 11, 1986

[54] STEAM TRAP FAILURE DETECTOR

[76] Inventor: Donald E. Wall, 6850 Washington St. NE., Minneapolis, Minn. 55432

[21] Appl. No.: 637,917

[22] Filed: Aug. 6, 1984

[51] Int. Cl.⁴ .................................................. G01K 3/00
[52] U.S. Cl. ..................................... 374/104; 374/147; 374/195; 374/198; 374/205; 116/221; 116/291
[58] Field of Search ............... 374/104, 106, 147, 195, 374/198, 200, 205, 187; 116/221, 298, 284, 291, 290, 292; 428/616; 236/94

[56] References Cited

U.S. PATENT DOCUMENTS

| 1,498,413 | 6/1924 | Whittier | 374/205 |
|---|---|---|---|
| 1,883,554 | 10/1932 | Chapman | 374/205 |
| 2,368,289 | 1/1945 | Coxon | 374/205 |

Primary Examiner—Charles Frankfort
Assistant Examiner—Thomas B. Will
Attorney, Agent, or Firm—Orrin M. Haugen; Thomas J. Nikolai

[57] ABSTRACT

Detector apparatus adaptably mountable about the external surface of steam pipes and condensate pipes, and wherein the apparatus includes a curved temperature sensitive bi-metallic element fixedly mounted at one end and with the opposed end being free to flex. A push arm is mounted at the free end of the bi-metallic element in engagement with a temperature indicating element for indicating a temperature either within or outside of a range of desired maximums and minimums, utilizing calibrated reference in the form of a rotatable dial. The surface temperature of the steam or condensate pipe being monitored is determined. The apparatus is provided with mounting member or system capable of use in combination with cylindrical surfaces within a range of diameters.

3 Claims, 3 Drawing Figures

STEAM TRAP FAILURE DETECTOR

BACKGROUND OF THE INVENTION

The present invention relates generally to temperature sensing apparatus, and more particularly to apparatus for determining the existence of normal temperature levels at a steam trap or other receptacle designed to be maintained at a substantially constant or normal temperature level. In its operation, the apparatus compares temperature levels and detects deviations that may occur at the detector location to the normal or desired temperature, whereby defective operation in a system, such as a steam system, is detectable. Steam trap usage is the normal and typical application for the apparatus of the present invention.

A typical steam trap is a pipe coupled automatic valve that permits condensed steam (condensate) to pass but which acts as a barrier to noncondensed steam. Thus, steam trap failure may occur with either the steam trap while in the open position, the closed, or partially open position. System efficiency is sacrificed upon the occurrence of failures in the steam trap or other steam consuming apparatus. In particular, a closed failure normally results where the steam trap mechanically fails or becomes clogged or plugged with dirt, scale or other residue, thus reducing heat transfer efficiency as well as the possible generation of carbonic acid, an acid which may cause corrosion in the steam system. An open failure, on the other hand, results in tremendous energy waste, undesired pressurization and an excessively high temperature in condensate systems with resultant inefficiency of the steam system.

In any failure mode, the defective steam trap can be detected through the monitoring of the localized temperatures at certain predetermined locations during system operation. Such failures, therefore, can be detected by means of appropriate temperature sensing apparatus operative in the ranges of the steam system being monitored. In particular, failures are detectable by means of monitoring the temperature levels occurring adjacent the steam trap inlet and outlet during normal operation and wherein temperature changes are indicative of either a failing or already failed steam trap which is designed or adapted to operate at a unique, relatively constant temperature level.

Heretofore, a number of apparatus and methods have been employed for detecting such failures. These include the use of contact stethoscope devices, chemical sensors which undergo visual changes, the intermittent opening or venting to atmosphere of valves in steam discharge lines for direct visual inspection, the use of pyrometric measuring devices, infrared emission detecting devices, pressure gauges and surface thermometers. These are standard systems which are in wide usage today. Depending upon which sensing apparatus is employed, however, a varying amount of benefit is obtained and normally at varying costs. Thus, while infrared emission sensors or detectors are desirable, they are extremely expensive. Listening and visual detection devices also offer benefits, however they, too, are rather expensive and/or subject to erroneous interpretation. Pyrometric and pipe surface thermometer measurements, on the other hand, offer similar modes for detecting temperature (i.e. surface temperature measurement) although at somewhat lesser cost.

The present invention provides permanent, continuous monitoring of temperature for convenient comparison of deviations to the pre-set zero datum point representative of a unique or normal temperature level.

Accordingly, the present invention is directed to a low cost, reliable temperature detecting apparatus which compares or detects deviations from unique or normal temperature levels and which can be employed in conjunction with the typically encountered rounded or curved pipe surfaces present in the lines used in virtually all steam systems. Furthermore, due to its low cost, the present invention may be more advantageously employed at a variety of locations in such systems for providing continuous monitoring in the severe environments normally encountered in steam systems. Further, because of its construction, the steam trap failure detector of the present invention is both reliable, and with its reliability being achieved at modest cost levels, particularly relative to the value to the user of the information obtained and the long and useful life of the apparatus. Thus significant advantages are available for most normal steam systems.

The above recited objects and advantages of the present invention as well as various others will, however, become more apparent upon reference to the following description of the present invention with respect to the following drawings. Although it is recognized that the present invention is described with respect to its presently preferred embodiment, various modifications, including those referred to hereinafter, may be made without departing from the spirit and scope of the present invention.

SUMMARY OF THE INVENTION

The present invention relates to temperature sensing apparatus for use with steam traps and the like so as to determine the continuous presence of a unique, normal or preselected temperature and to permit the detection of subsequent temperature excursions to higher and lower levels. From this "history", system operation, and in particular, the occurrence of system failures can be determined. The present invention, however, is not limited to steam trap failure detecting applications, but rather may also serve any temperature sensing and monitoring application where knowledge of the history of temperature exposure is necessary, e.g., ovens, refrigerated spaces, or the like.

Figure 1:
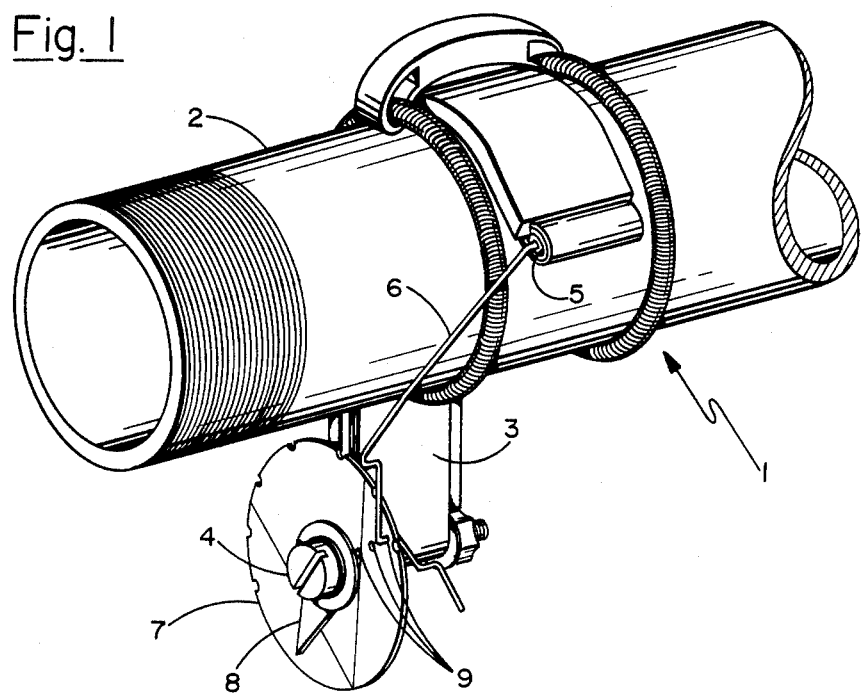
FIG. 1 is a perspective view of the present steam trap failure detector shown as it is mounted in a typical steam or condensate pipe.
Figure 2:
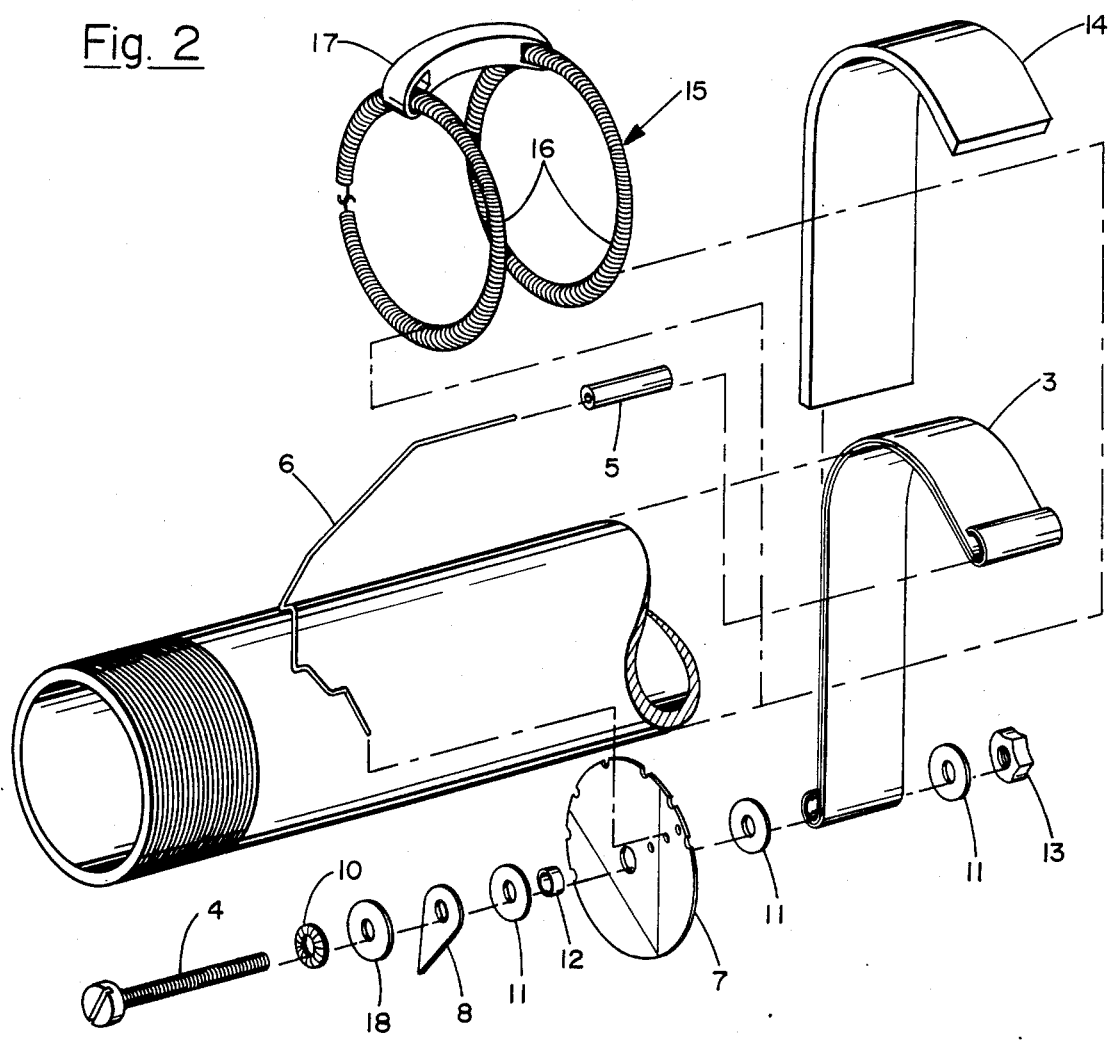
FIG. 2 is an exploded perspective view of the detector shown in FIG. 1, along with an insulating jacket/coating, and mounting clamp.
Figure 3:
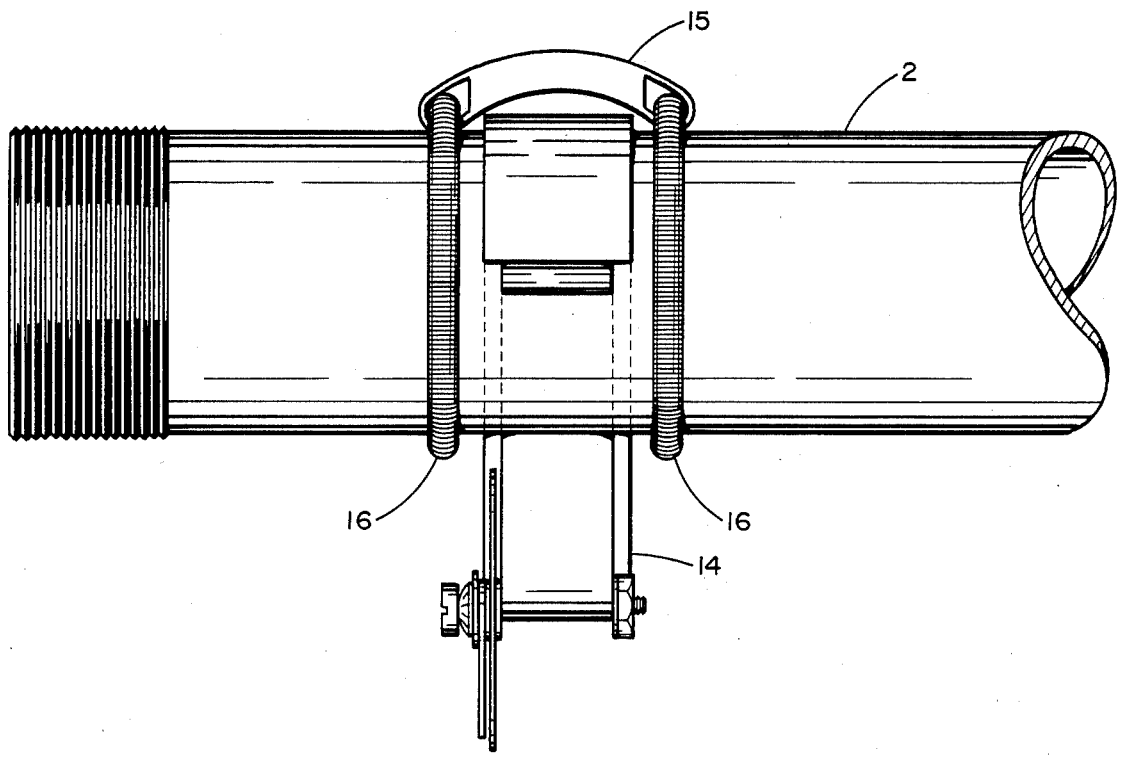
FIG. 3 is a front elevational view of the detector and the steam pipe mounting clamp assembly.

With particular attention being directed to FIGS. 1 and 2 of the drawings, the present steam trap failure detector of the present invention comprises a temperature sensor such as a "U"-shaped bi-metallic strip adaptively formed for contact mounting around the outside surface or outer perimeter of a steam conduit or pipe. The ends of the "U" shaped bi-metallic strip spread arcuately outwardly with increasing temperature and contract to become closer together with decreasing temperature. A dial and pointer assembly is fixedly attached, via a shaft, to one end of the bi-metallic strip and a bushing is frictionally held to the other end. A rigid link is coupled between the two ends of the bi-metallic strip, passing through a preselected hole in the dial at one end, and through the bushing, to which the rod is permanently held, at the other end. Expansion arcuately outwardly of the end of the bi-metallic strip will cause the dial to rotate in a counterclockwise direction, and contraction of the bi-metallic strip will cause the dial to rotate in a clockwise direction. The dial is provided with a scale and zones indicating a range of temperatures including a high temperature and a low temperature to which the rotatably adjustable pointer can be set for determining if the unit has been exposed to indicated temperatures outside of the preset range. A bi-metallic sensing element having an appropriate time constant is selected to provide quick or nearly instant response to temperature changes.

Before installation or attachment of the apparatus on a pipe, the connecting rod is removed. The sensor element is placed over the pipe and, if used, the clamping mounting device is installed in such a manner as to hold the bare area of the sensor element in a fixed position on the surface of a steam conduit or pipe. After the sensing element has expanded or contracted to the position that is representative of the unique normal temperature of the pipe at the location selected, the connecting rod is attached by insertion of one end into a dial hole and insertion of the bushing end into the free end of the sensor element.

With the structure of the present invention, a connecting rod is arranged to be inserted into a hole formed in a disc-shaped dial, and wherein the dial is arranged for free rotation about its axis. The arcuate position is thereafter compared to a frictionally constrained and positioned pointer to determine the system condition. In an alternative embodiment, the disc-shaped dial may be frictionally constrained while the connecting rod is inserted into a hole formed in a pointer arranged for axial movement about the disc axis.

In an alternative embodiment, electrical switch contacts may be mounted relative to the adjustable pointer such that relative to dial rotation, switch closures may indicate predetermined alarm or temperature exposure points.

DESCRIPTION OF THE PREFERRED EMBODIMENT

With reference to FIG. 1, the steam trap failure detector 1 is illustrated, wherein the detector is mounted about a curved surface 2, such as that typically encountered in the pipes of a typical steam system. The temperature sensor is a pre-formed bi-metallic strip 3 having ends shaped or conformed to accept the shaft 4 and hub 5. The bi-metallic strip is shaped to accommodate each diameter of pipe to which it may reasonably be expected to be attached. A different size steam trap failure detector may be required for each standard size or range of sizes of pipe. A dial 7, caused to rotate by connecting rod 6 is inserted into a dial hole 9, indicates temperature departure from a desired normal temperature range pre-set into pointer 8.

With reference to FIG. 2, the sensor element of the preferred embodiment is comprised of a formed bi-metallic strip 3, one end of which is shaped to accept a rigidly fastened shaft 4, and the other end which is shaped to accept a friction fit hub 5, to which a connecting rod 6 is inserted and held. The other end of the connecting rod 6 is inserted in a selected hole 9 of the dial 7. The various dial actuating holes are located in radially spaced relationship to permit selective response of the dial. While the pipe surface temperature is at its unique or normal level or range, it is desirable to position the dial such that a right angle is formed between the rod 6 and the center of the dial 7 with the hole 9 being disposed at the vertex of the right angle. This permits maximum rotation of the dial 7 in both counterclockwise and clockwise directions (approximately 90° in each direction). To properly position or set the dial at the unique normal temperature, it is necessary to have a variable length connecting rod. The rod, as shown in FIG. 1 and FIG. 2, is formed with a series of angular steps forming a number of spaced rod segments each of which extend parallel to the axis of rotation of dial 7. Any one segment may be selected to achieve the desired working length of the rod. A number of other designs, all of which produce an adjustable length connecting rod, may be used. A hole located adjacent the center of the dial causes a greater stroke per degree of temperature change than does the hole at the outer diameter of the dial. Thus, for applications where a large indicated response is desired, the hole nearest to dial center is used. Conversely, the outer hole is selected for applications where less response is desired. Further, the connecting rod limits rotation of the dial to approximately 180°. The extension of the rod on the back side of the dial comes into contact with the shaft at its limit and, on the front side, the rod comes into contact with the shaft head to limit rotation. Thus, the dial cannot rotate into or lock at an inoperative position, provided the connecting rod is initially placed in a hole on the side of the dial away from the pipe.

In situations where the temperature is expected to deviate in only one direction (e.g., will only be cooler), and where it is advantageous to obtain maximum response, the connecting rod may be inserted in the dial to optimize the working length of the connecting rod. For example, if only temperatures below the unique normal level are expected, a connecting rod length will be selected which places the dial holes closer to the hub end of the sensor at the unique normal temperature. In this disposition the connecting rod does not form the right angle relationship as described earlier.

Arcuate motion due to expansion or contraction of the sensor causes the connecting rod to impart rotational movement to the dial 7, relative to the manually adjustable position of a pointer 8. A second pointer may be frictionally fastened to the shaft to permit the setting of two different reference points (e.g., high limit and low limit). Relative to the single pointer model, the position of pointer 8 is compared to the arrow head of the dial. At the initial setting, the pointer is manually rotated to be in alignment with the dial arrow point such as at its datum or zero point. Subsequent changes in temperature will cause the dial to rotate, placing the pointer over either the red area of the dial, normally indicating a temperature increase, or blue, less warm area of the dial, normally indicating a temperature decrease. The extent or amount of change indicated is a function of both the magnitude of temperature change and the hole distance from the dial center. Markings on the dial may be used to indicate the relative degree of temperature change.

The dial is free to rotate about the shaft 4 by means of being supported on the shaft by a bushing-spacer 12 having a width slightly greater than the dial thickness and having an outside diameter slightly less than the dial center hole. To avoid contact of the dial with the bi-metallic strip, a flat washer 11 is placed between the bi-metal and the bushing-spacer 12. A Belleville washer 10 is placed in front of the pointer to provide frictional positioning of the pointer, independent of dial movement. The amount of friction holding the pointer in any given position can be varied by the tightness of the self-locking nut 13 against a flat washer 11.

The steam trap failure detector 1 is mounted about a pipe by means of an elastic mounting clamp assembly 15, consisting of two stainless steel extension springs 16 and a pad 17, which are fastened around the pipe, over the bi-metallic sensor 3, and also over any insulating jacket or coating which may be present, to permit the steam trap failure detector to be mounted in any relative position on the pipe including either vertical or horizontal dispositions. The steam trap failure detector may be mounted on horizontal pipes without the need for a clamping type mounting device.

An insulating jacket 14 or coating may be applied to the bi-metallic sensor on all surfaces except the surface adjacent to and in contact with the pipe to which it is mounted. Such insulating layer eliminates the influence of changes in ambient temperatures or other interference, such as drafts due to fans creating air flow across the steam trap failure detector.

The bi-metal sensor is selected to expand and contract to produce an angular response permitting operation from temperatures below zero degrees F. up to those maximums typically found in steam system pipes such as at approximately 500° F. Bi-metallic materials can be selected to respond to narrow temperature bands or wide temperature bands in accordance with the desired application. Bi-metallic materials can be selected to operate the apparatus effectively in direct contact with surfaces at temperatures approaching 1000° F. On the other hand, for steam trap malfunctions, the principal manifestation is temperature change away from the pre-set unique normal temperature. Thus relative temperatures or ranges of temperature only are required, rather than exact or absolute temperatures. It is also to be recognized, though, that given a calibrated dial, a reasonably accurate present temperature can be observed and monitored. It should be recognized too, that although a scale is provided on the dial, the scale is typically not calibrated but rather used only as a relative indicator of extreme conditions. However, the scale may be calibrated or alternatively various other markings might be employed so as to provide the operator with an appropriate reference.

Where circumstances do not permit casual inspection of the mounted steam trap failure detector 1, or alternatively where another form of warning or system condition information is desired, a switch closure may be incorporated into the present steam trap failure detector 1 so as to provide an electrical or electronic control signal that may be appropriately monitored. In this connection, the electrical or electronic control signal may be in addition to a visual signal such as, for example, to a mechanical flag or the like which may be utilized in combination with a device providing electrical or electronic output signals.

While the present invention has been described with respect to its presently preferred embodiment, it should be apparent from the above that numerous changes may be made thereto without departing from the spirit and scope thereof. Accordingly, it is contemplated that the following claims shall be interpreted so as to include those equivalent embodiments of the present invention which are within the spirit and scope of the above-referenced changes and the language of the following claims.

What is claimed is:
1. Thermal responsive apparatus comprising:
 (a) an arcuately curved bi-metallic strip comprising a temperature sensing element mounted with one end thereof receiving a rotatable axle and one end being a free end, with said sensing element being fixedly coupled to said rotatable axle, and with the free end thereof being mounted adjacent a temperature variable surface and with a disc means coupled to said rotatable axle and being free to rotate;
 (b) a push arm having one end coupled to the free end of said sensing element and its opposed end coupled to said disc means, and a temperature indicating means being disposed on said disc means;
 (c) a temperature indicating arm frictionally mounted to said rotatable axle, whereby the sensed temperature variations are indicated relative to the temperature indicating means coaxially mounted on said rotatable axle.

2. The thermal responsive apparatus as defined in claim 1 being particularly characterized in that resilient spring means are provided for releasably securing said thermal responsive apparatus to a heated surface of cylindrical configuration.

3. The thermal responsive apparatus as defined in claim 1 being particularly characterized in that a plurality of radially spaced bores are formed in said disc means to receive said push arm therewithin.

* * * * *